United States Patent
Krishnakumar et al.

(10) Patent No.: US 9,137,213 B2
(45) Date of Patent: Sep. 15, 2015

(54) ON-DEMAND FEATURE SERVER ACTIVATION IN THE CLOUD

(75) Inventors: Anjur S. Krishnakumar, Princeton, NJ (US); Parameshwaran Krishnan, Basking Ridge, NJ (US); Navjot Singh, Denville, NJ (US); Shalini Yajnik, Berkeley Heights, NJ (US)

(73) Assignee: Avaya Inc., Basking Ridge, NJ (US)

( * ) Notice: Subject to any disclaimer, the term of this patent is extended or adjusted under 35 U.S.C. 154(b) by 892 days.

(21) Appl. No.: 12/748,131

(22) Filed: Mar. 26, 2010

(65) Prior Publication Data

US 2011/0239120 A1 Sep. 29, 2011

(51) Int. Cl.
G06F 3/00 (2006.01)
H04L 29/06 (2006.01)
H04L 29/08 (2006.01)

(52) U.S. Cl.
CPC ............ H04L 63/0428 (2013.01); H04L 67/10 (2013.01)

(58) Field of Classification Search
CPC . H04L 12/66; H04L 65/1023; H04L 65/1033; H04L 29/06176; H04L 65/103; H04L 41/0893; H04L 12/14; H04L 67/10; H04Q 3/0045
See application file for complete search history.

(56) References Cited

U.S. PATENT DOCUMENTS

| | | | |
|---|---|---|---|
| 6,990,666 B2* | 1/2006 | Hirschfeld et al. | 718/104 |
| 7,596,620 B1* | 9/2009 | Colton et al. | 709/226 |
| 8,046,694 B1* | 10/2011 | Lappas et al. | 715/740 |
| 8,170,017 B2* | 5/2012 | Fletcher et al. | 370/389 |
| 8,578,076 B2* | 11/2013 | van der Linden et al. | 710/72 |
| 2003/0105810 A1* | 6/2003 | McCrory et al. | 709/203 |
| 2009/0276771 A1* | 11/2009 | Nickolov et al. | 717/177 |
| 2010/0088234 A1* | 4/2010 | Moore et al. | 705/52 |
| 2010/0138488 A1* | 6/2010 | Fletcher et al. | 709/203 |
| 2010/0146422 A1* | 6/2010 | Seong et al. | 715/765 |
| 2010/0217864 A1* | 8/2010 | Ferris | 709/226 |
| 2010/0241579 A1* | 9/2010 | Bassett et al. | 705/319 |
| 2010/0318609 A1* | 12/2010 | Lahiri et al. | 709/205 |
| 2011/0055385 A1* | 3/2011 | Tung et al. | 709/224 |
| 2011/0075667 A1* | 3/2011 | Li et al. | 370/392 |
| 2011/0075674 A1* | 3/2011 | Li et al. | 370/401 |
| 2011/0078303 A1* | 3/2011 | Li et al. | 709/224 |
| 2011/0096762 A1* | 4/2011 | Basart | 370/338 |
| 2011/0154231 A1* | 6/2011 | Cherdron et al. | 715/764 |
| 2012/0079100 A1* | 3/2012 | McIntyre et al. | 709/224 |
| 2012/0137173 A1* | 5/2012 | Burshan et al. | 714/15 |
| 2012/0179824 A1* | 7/2012 | Jackson | 709/226 |
| 2014/0157380 A1* | 6/2014 | Abrams et al. | 726/7 |
| 2014/0316990 A1* | 10/2014 | Winston | 705/44 |

* cited by examiner

*Primary Examiner* — Ryan Pitaro
(74) *Attorney, Agent, or Firm* — Sheridan Ross P.C.

(57) ABSTRACT

A feature activation system provides a mixed computing environment that includes a server and cloud computing. The hybrid model splits the execution of a communication feature between the cloud and the enterprise server installed at or with the enterprise. Service activation is linked to a portal that can communicate with either an intermediary system or directly with an entity executing computer programs in the cloud. When the customer desires to use a feature, the customer accesses the portal and activates the feature the enterprise desires. In the background, the portal instantiates a virtual machine, on any cloud platform, and then installs the feature with virtual machine on that cloud server. To execute feature, the enterprise server and the virtual machine exchange information between the server and the cloud and allow the feature to access the enterprise server or enterprise data. When the user has completed feature execution, the instance of the feature may be stopped and discarded and any data may be saved either at the enterprise or within the cloud.

20 Claims, 9 Drawing Sheets

ON-DEMAND FEATURE SERVER ACTIVATION IN THE CLOUD

BACKGROUND

Communication systems often include features that a business can use to further enhance their communications abilities. These features could be, for example, exporting of call logs to travelers who are away from the office, recording calls or conferences, conferencing with external businesses, web conferencing, presence servers, analytics, and other features. Unfortunately, there are generally two ways of activating features with a communication system. The first method requires bundling the features within a feature server that is sold to the business. For small and medium size companies, the feature server is extremely expensive and generally is cost prohibitive. The other method requires the enterprise to activate or use the feature at a distant computing system, e.g., a remote server made available to the enterprise. The remote systems are not owned by the entity executing the software. As such, third-parties can provide computing services to entities on a subscription basis. However, the remote system for activating features is also not always practical because enterprises often have difficulty determining what features are needed or would be used. Thus, enterprises often purchase subscriptions that are not used or of little use. Further, the remote servers that are used for the features often fail and leave the enterprise with no ability to use the features.

SUMMARY

The embodiments presented herein provide systems and methods for executing features in a mixed computing environment that includes a server and cloud computing. The hybrid model splits the features between the cloud and the enterprise server installed at or with the enterprise. Further, feature activation may be on-demand. Thus, the embodiments provide a turn-key solution with an on-demand service activation feature. Service activation is linked to a portal that can communicate with either an intermediary system or directly with an entity executing computer programs in the cloud. When the customer desires to use a feature, the customer accesses the portal and activates the feature the enterprise desires. In the background, the portal instantiates a virtual machine, on any cloud platform, and then installs the feature with virtual machine on that cloud server. To execute feature, the enterprise server and the virtual machine exchange information between the server and the cloud and allow the feature to access the enterprise server or enterprise data. When the user has completed feature execution, the instance of the feature may be stopped and discarded and any data may be saved either at the enterprise or within the cloud.

Thus, the customer, which may be a small or medium sized business owner, is provided an on-demand service activation feature that eliminates the need for a subscription service or the need to install expensive communications equipment at the enterprise. Some examples of features that can exploit the novel architecture and methods include: (i) export of call logs to travelers; (ii) recording calls and/or conferences on the cloud (this can be done via an extension in the cloud or at the local server that receives the audio stream); (iii) conferencing with users external to the business; and (iv) webconferencing; (v) executing a presence server in the cloud; (vi) generating analytics; (vii) allowing a customer to test a service or feature (i.e., customers can test new features with data from their own installations as opposed to demonstrations); (vii) providing all other feature servers with web access; etc. The small business owner may subsidize the payment of the service by receiving advertisements. The feature service provider need not own the cloud infrastructure or the small business owner's on-premise equipment.

For enterprises where cloud data privacy is an issue, there are several options. If access is through a personal endpoint (e.g., an iPhone, enterprise laptop, etc.), there can be a shared key (SK) between the enterprise and the endpoint. Data is encrypted with the SK and stored in the cloud. Data is decrypted at the secure endpoint after a secure download. The decryption/encryption can also be done with a public-private key pair. The data privacy scheme ensures that only encrypted data is stored in the cloud. Other embodiments use an encrypted file system for storage in the cloud that can include an on-access/on-the-fly decryption at the local server (e.g., using Truecrypt or similar techniques).

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "computer-readable medium" as used herein refers to any tangible storage that participates in providing instructions to a processor for execution. Such a medium may take many forms, including but not limited to, non-volatile media, and volatile media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, or any other medium from which a computer can read. When the computer-readable media is configured as a database, it is to be understood that the database may be any type of database, such as relational, hierarchical, object-oriented, and/or the like. Accordingly, the embodiments is considered to include a tangible storage medium and prior art-recognized equivalents and successor media, in which the software implementations of the present embodiments are stored.

The terms "determine", "calculate" and "compute," and variations thereof, as used herein, are used interchangeably and include any type of methodology, process, mathematical operation or technique.

The term "module" or "component" as used herein refers to any known or later developed hardware, software, firmware, artificial intelligence, fuzzy logic, or combination of hardware and software that is capable of performing the functionality associated with that element. Also, while the embodiments are described in terms of examples, it should be appreciated that individual aspects of the embodiments can be separately claimed.

The phrase "in communication with" can mean any exchange of signals, information, and/or data between two or more modules, systems, components, or other items described herein using any system, protocol, method, and/or format, regardless of whether the communications are wired or wireless.

BRIEF DESCRIPTION OF THE DRAWINGS

The present disclosure is described in conjunction with the appended figures.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

The ensuing description provides embodiments only, and is not intended to limit the scope, applicability, or configuration of the appended claims. Rather, the ensuing description will provide those skilled in the art with an enabling description for implementing the embodiments. It is to be understood that various changes may be made in the function and arrangement of elements without departing from the spirit and scope of the appended claims as set forth in the appended claims.

Figure 1:
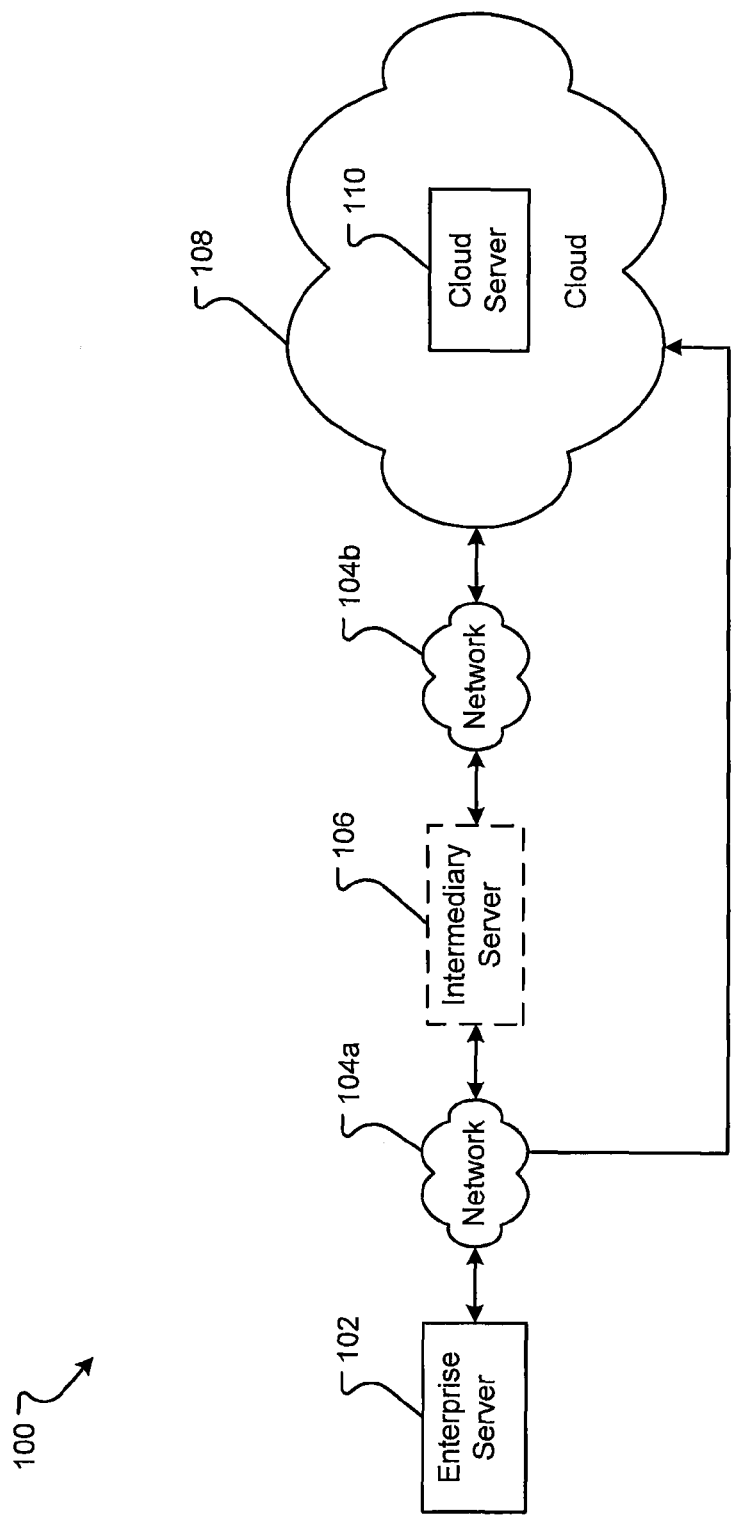
FIG. 1 is a block diagram of an embodiment of a system operable to provide on-demand feature activation in a cloud computing environment.

An embodiment of a feature provider system 100 is shown in FIG. 1. The feature provider system 100 can include an enterprise server 102, a network 104a and/or 104b, an intermediary server 106, and/or a cloud 108. The cloud 108 can include a cloud server 110. The one or more components of the feature provider system 100 shown in FIG. 1 may be hardware, software, or a combination of hardware and software. The components can be servers or computing systems as described in conjunction with FIGS. 5 and 6. Each of the components described in conjunction with FIG. 1 and the one or more other components, modules, software functions, or other items described hereinafter may communicate with each other. The function and interaction of the components of FIG. 1 shall be explained hereinafter.

An enterprise server 102 can be any computing system which offers communication or software functionality for an enterprise. Generally, the enterprise server 102 may be a computing system that is provided to a small or medium sized organization. The enterprise server can complete communications or other actions for the entity or enterprise. An embodiment of the enterprise server 102 is described in conjunction with FIG. 2a. In one embodiment, the enterprise server 102 is a private branch exchange (PBX).

Optionally, the enterprise server 102 can communicate with an intermediary server 106 through a network 104a. The network 104a can be any communication system. For example, a network 104a may include one of, but is not limited to, an Intranet, the Internet, a wide area network, a local area network, a wireless local area network or other communication system or network. The network 104a may use any format or protocol to communicate data or other information between the enterprise server 102 and one or more other components as shown in FIG. 1.

The intermediary server 106, optionally, can receive signals from the enterprise server 102 and communicate signals or actions to the cloud 108. In embodiments, the intermediary server 106 is executed by an organization that assists the enterprise server 102 in providing features. An embodiment of an intermediary server 106 is shown in FIG. 2b. The cloud 108 can be any cloud computing environment executed over the Internet, Intranet, or other computing system networks and/or environments. Some computing system environments are explained in conjunction with FIGS. 5 and 6. The cloud 108 may include a cloud server 110 which can represent a single computing system as described in conjunction with FIG. 6. The cloud server 110 can execute a feature application for the enterprise server 102. Cloud computing is well-known in the art and will not be explained further here and after.

Figure 2A:
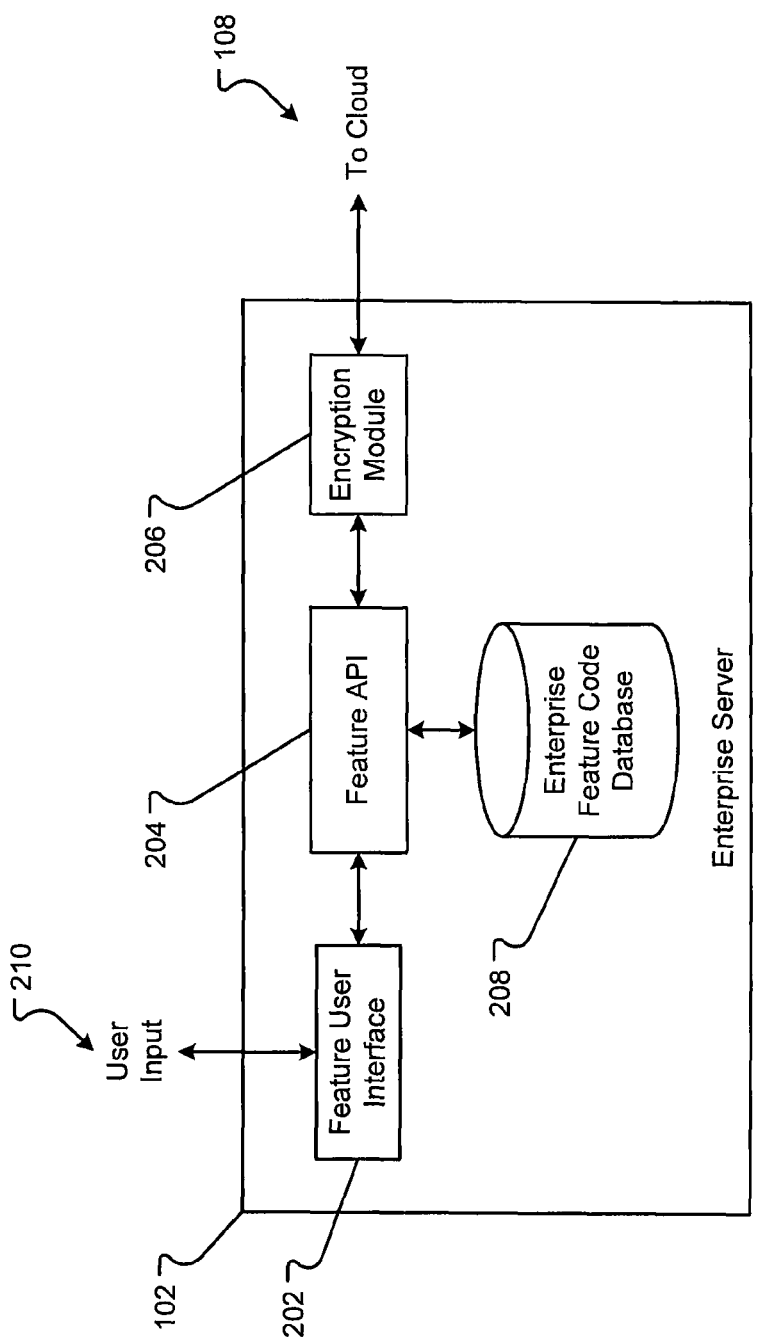
FIG. 2A is a block diagram of an embodiment of an enterprise server.
Figure 2B:
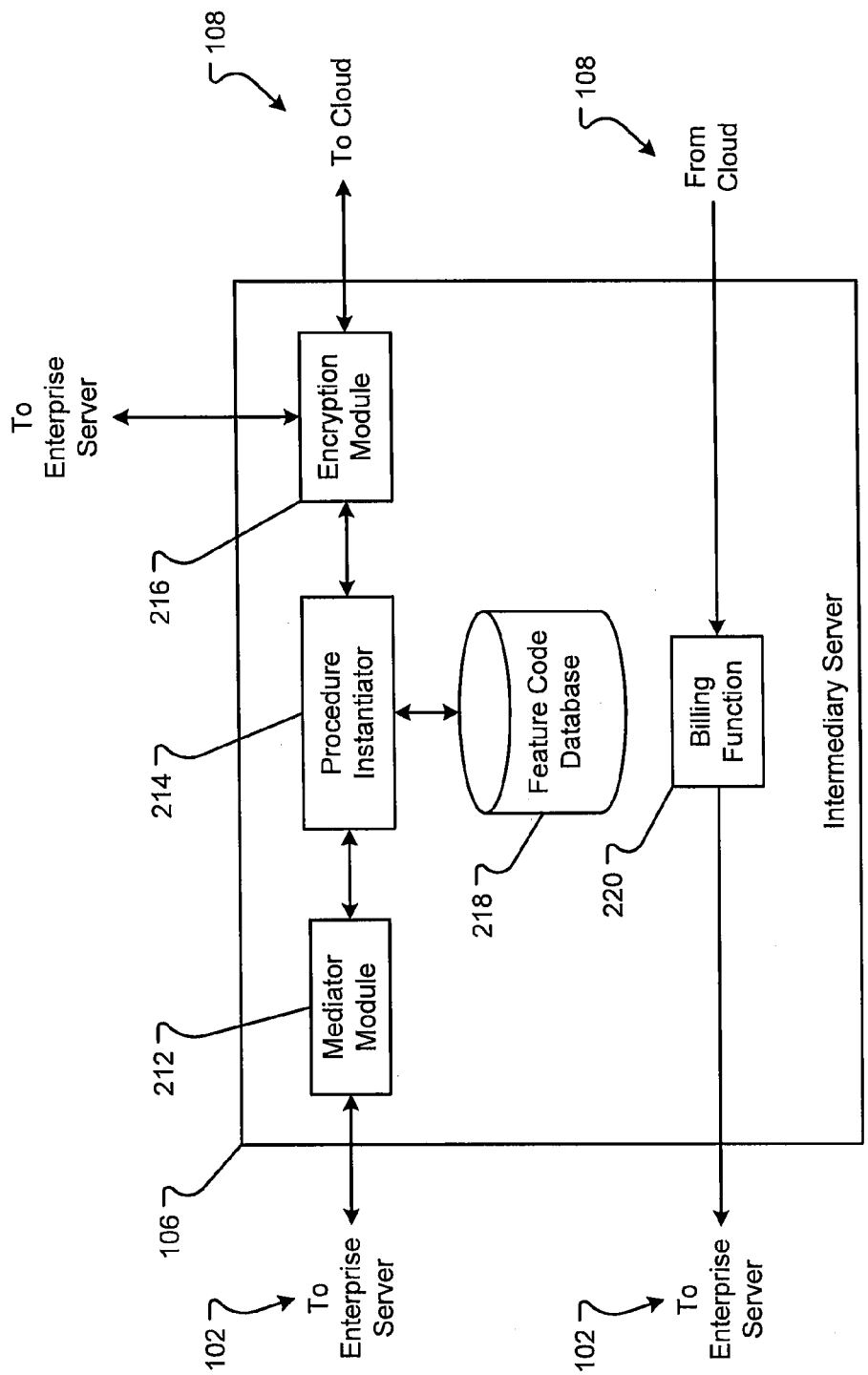
FIG. 2B is a block diagram of an embodiment of an intermediary server.

An embodiment of an enterprise server 102 is described in conjunction with FIG. 2a. The enterprise server 102 may be a computing system as described in conjunction with FIGS. 5 and 6. The enterprise server 102 may include one or more modules, functions, or components that execute to provide communication features or the ability to enable communication features for the enterprise. The enterprise server 102 can include a feature user interface (UI) 202, a feature application programming interface (API) 204, an encryption module 206, and/or an enterprise feature code database 208. The several modules, 202, 204, 206, 208 shall be explained as being software code executed by the enterprise server 102. However, in alternative embodiments, the modules 202, 204, 206 and 208 may be logics circuits or other hardware especially designed in an application specific integrated circuit (ASIC), or field programmable gate array (FPGA) or other hardware. Thus, modules 202, 204, 206, and 208 shall be described as being software code executed within a computing system.

The feature user interface 202 is operable to receive user input 210. User input 210 can include a selection of an already-enabled feature, a request to enable a feature, a request to disable a feature, and/or one or more other user inputs. The user inputs 210 may be received in an input device, as explained in conjunction with FIGS. 5 and 6. The user inputs 210 can instruct the feature user interface 202 to execute functions or activities the user desires.

The feature user interface 202 can interpret the user input 210 and provide signals to the feature API 204 to execute or conduct certain actions related to the features. The feature user interface 202 may also communicate with an intermediary server 106 or a cloud server 110 through the network 104a. As such, the feature user interface 202 can provide a display of features from the intermediary server 106 and/or cloud server 110 that can be enabled or selected by the user with user input 210. Further, the feature user interface 202 send signals to the intermediary server 106 or cloud server 110 to enable or execute certain features.

A feature API 204 can translate functions or signals from the feature user interface 202 into a protocol or format readable or understandable by an intermediary server 106 or cloud server 110. The feature API 204 can also execute some feature code on the enterprise server 102, such as receiving initial inputs or rendering the UI displays, and/or can interface with the enterprise feature code database 208. A feature API 204 is the main processing component of the enterprise server 102 that allows functioning of the feature at the enterprise server 102.

An encryption module 206 can be optional. The optional encryption module 206 may encrypt or decrypt communications to and from either the intermediary server 106 or the cloud 108. The encryption can be any encryption including pretty good privacy PGP encryption, private key encryption, public key encryption, or any other type of encryption that may be executed with the enterprise server 102.

An enterprise feature code database 208 may be operable to store one or more portions of feature code within the enterprise server 102. In embodiments, the feature code stored with the enterprise server 102 is not complete. As such, in order to execute or enable the feature code, the enterprise server 102 can execute a portion of the feature code in the cloud 108. Thus, the enterprise feature code database 208 may only provide enough feature codes to complete the interface between enterprise server 102 and the cloud 108. The enterprise feature code database 208, in some embodiments, may also be able to store data related to a feature. For example, a first execution of a feature may result in the creation of data. The data may be stored in the enterprise feature code database 208 and then retrieved and used in the second execution of a feature at a later time.

An embodiment of an intermediary server 106 is shown in FIG. 2B. It should be noted that the intermediary server 106 is an optional component within the feature provider system 100. As such, it is possible for the enterprise server 102 to interact directly with the cloud 108 without the intermediary server 106. However, in alternative embodiments, the intermediary server 106 can provide functionality that allows the interaction between the enterprise server 102 and the cloud 108.

Figure 5:
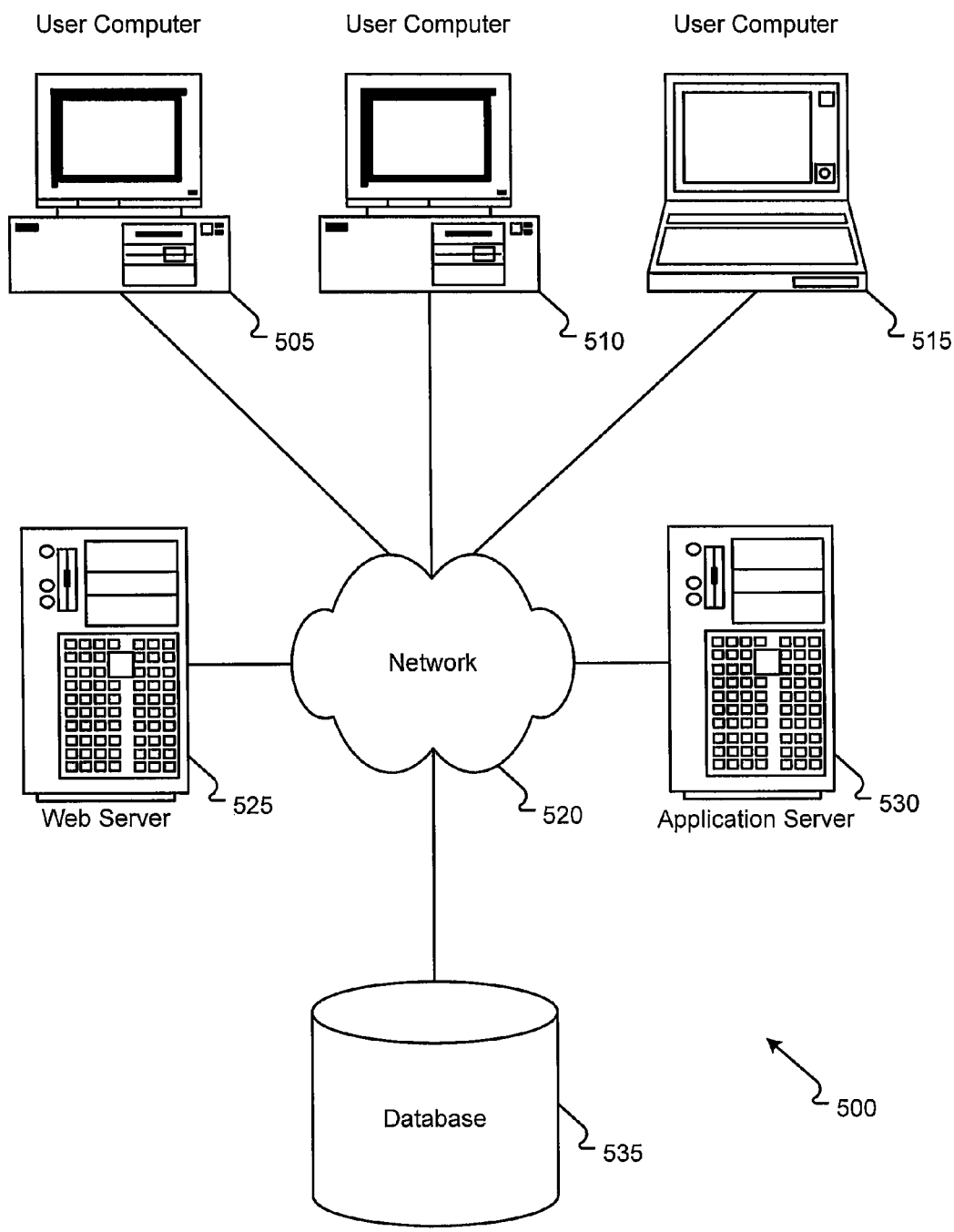
FIG. 5 is a block diagram of an embodiment of a computer system environment in which the systems and methods may be executed.
Figure 6:
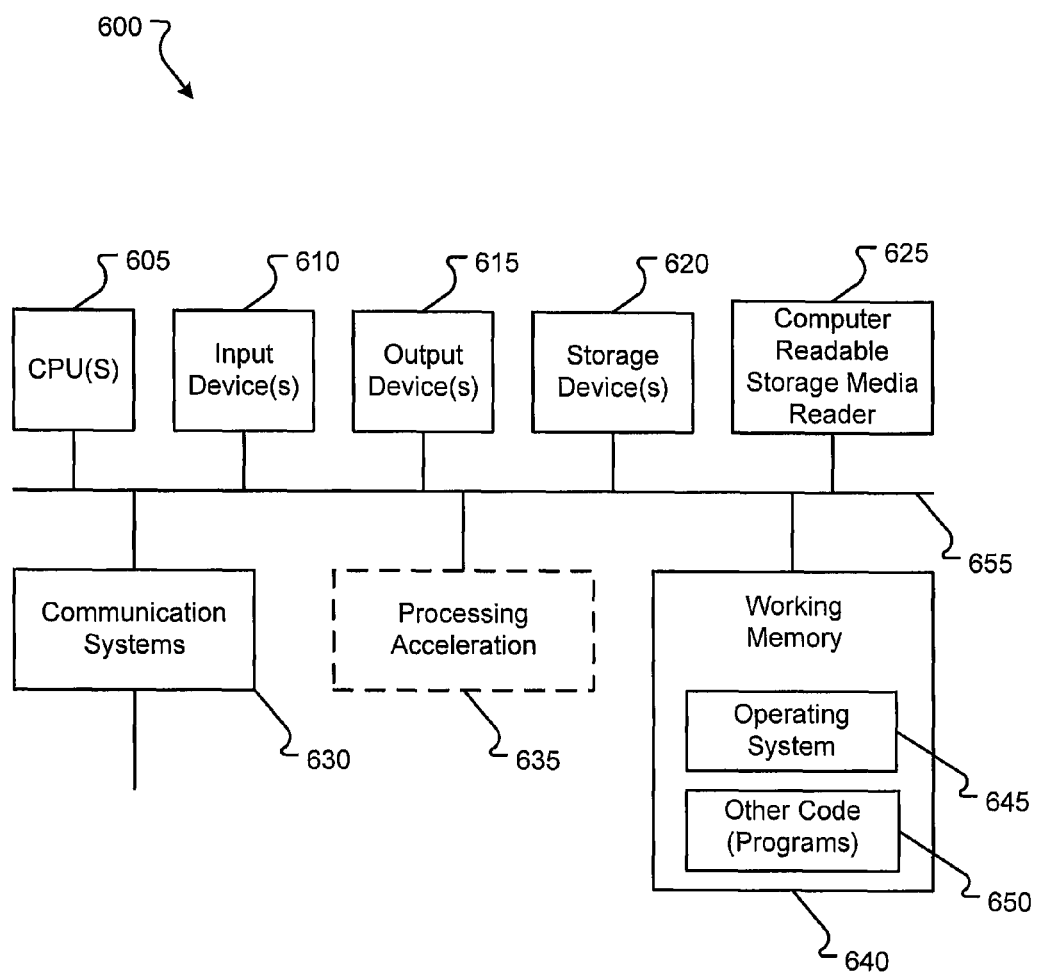
FIG. 6 is a block diagram of a computer system in which the systems and methods may be executed.

The intermediary server 106 may be a computer system as explained in conjunction with FIGS. 5 and 6 and, as such, the components or modules described in conjunction with FIG. 2B may be software code executed by the intermediary server 106. However, in other embodiments, the components or modules described in conjunction with FIG. 2B, may be hardware created in an ASIC, FPGA, or some other hardware. The intermediary server 106 can include a mediator module 212, a procedure instantiator 214, an encryption module 216, a feature code database 218, and/or a billing function 220. The mediator module 212 can communicate or mediate the communications between the enterprise server 102 and the cloud 108. As such, the mediator module 212 can receive a request to instantiate, to enable a feature or to disable a feature from the enterprise server 102. The mediator module 212 may interpret the communications from the enterprise server 102 and send signals to the procedure and instantiator 214 to instantiate, enable/disable, or to conduct some other action associated with the feature.

The procedure instantiator 214 can instantiate feature code or instruct the cloud 108 to instantiate feature code associated with the feature which is the subject of the communication from the enterprise server 102. The procedure instantiate 214 can retrieve feature code from the feature code database 218 and attach the code to a transmission packet for the cloud 108. The communication to the cloud 108 may also include instructions or signals that require the execution of the feature code. In other circumstances, the procedure instantiator 214 may also instruct the cloud to deactivate/disable or conduct some other action on feature code that is already executing in the cloud 108.

The feature code database 218 can be any database as described in conjunction with FIGS. 5 and 6. The feature code database 218 may be able to store one or more items of feature code software that may be executed on the cloud 108. An encryption module 216 may encrypt or decrypt communications that are sent or received from the enterprise server 102 or the cloud 108. The encryption module 216 may be the same or similar to the encryption module 206 and, as such, shall not be explained further herein.

Along with the encryption module 206, the intermediary server 106 may optionally include a billing function 220. A billing function 220 is a module, component or software that receives billings or bills from a cloud 108 or a third-party that executes the feature within the cloud 108 and requires payment. The billing function 220 may receive the information for payment and forward or reformat the information for forwarding to the enterprise server 102. In some embodiments, the billing function 220 may also receive payment from the enterprise server 102 and forward the payment to the cloud 108 or the third-party that executes the feature within the cloud 108. As such, the intermediary server 106 may act as a billing entity for the feature provider system 100.

Figure 2C:
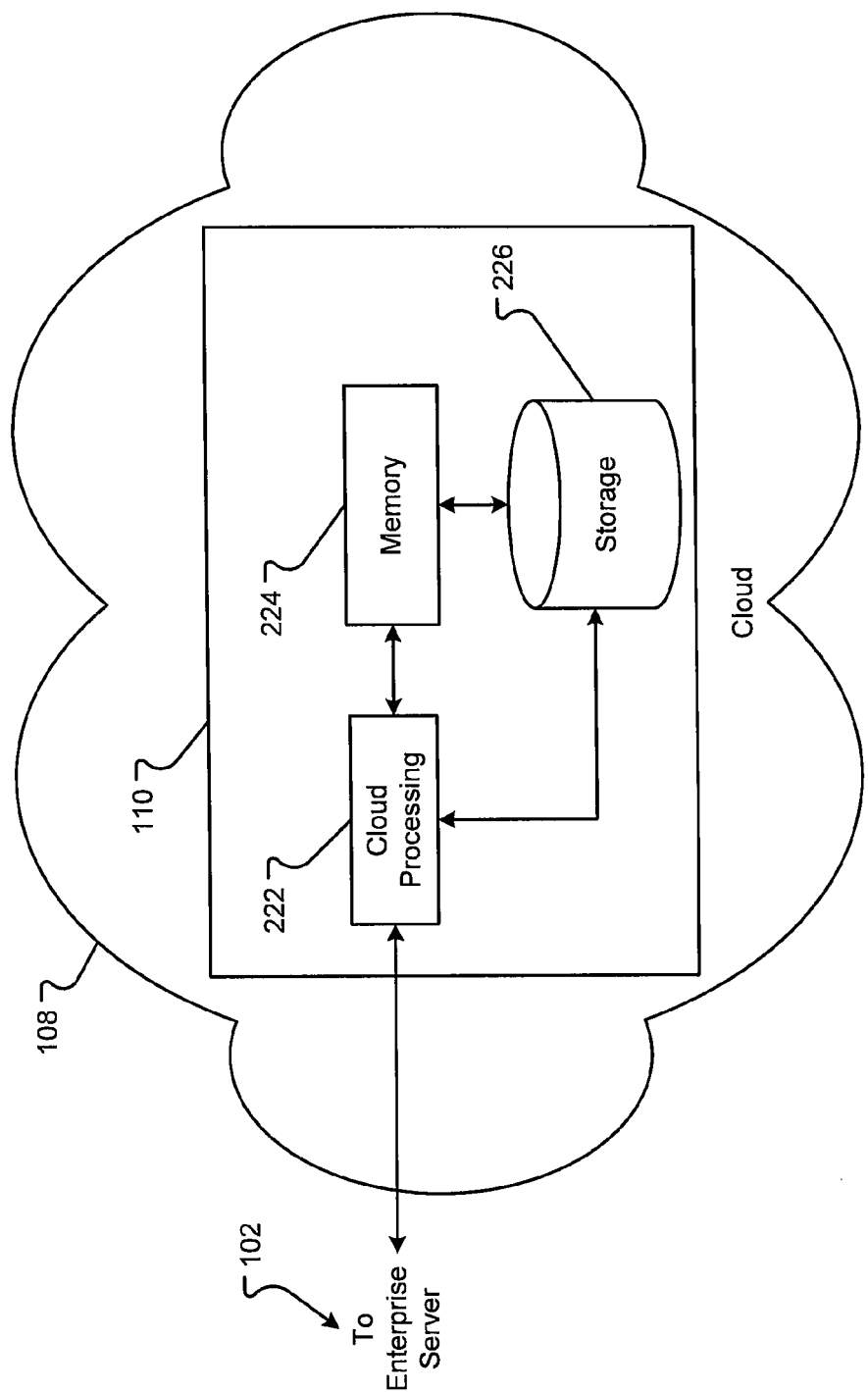
FIG. 2C is a block diagram of an embodiment of a cloud computing environment.

An embodiment of a cloud computing system is shown in FIG. 2C. The cloud 108, as explained in conjunction with FIG. 1, may include one or more servers 110, which may be computer systems as described in conjunction with FIGS. 5 and 6. The server 110 or other computer system may provide some basic computing hardware such as cloud processing 222, memory 224, and/or storage 226. The cloud processing 222 can be any processor or system that executes the feature code. The memory 224 can be any memory or storage that stores the feature code either during execution or before or after the feature is instantiated and executed. The storage 226 can be any storage or database as explained in conjunction with FIGS. 5 and 6, which may store all or a portion of the feature code or may store data related to one or more features. The cloud processing system can be in communication with the enterprise server 102 or the intermediary server 106.

Figure 3:
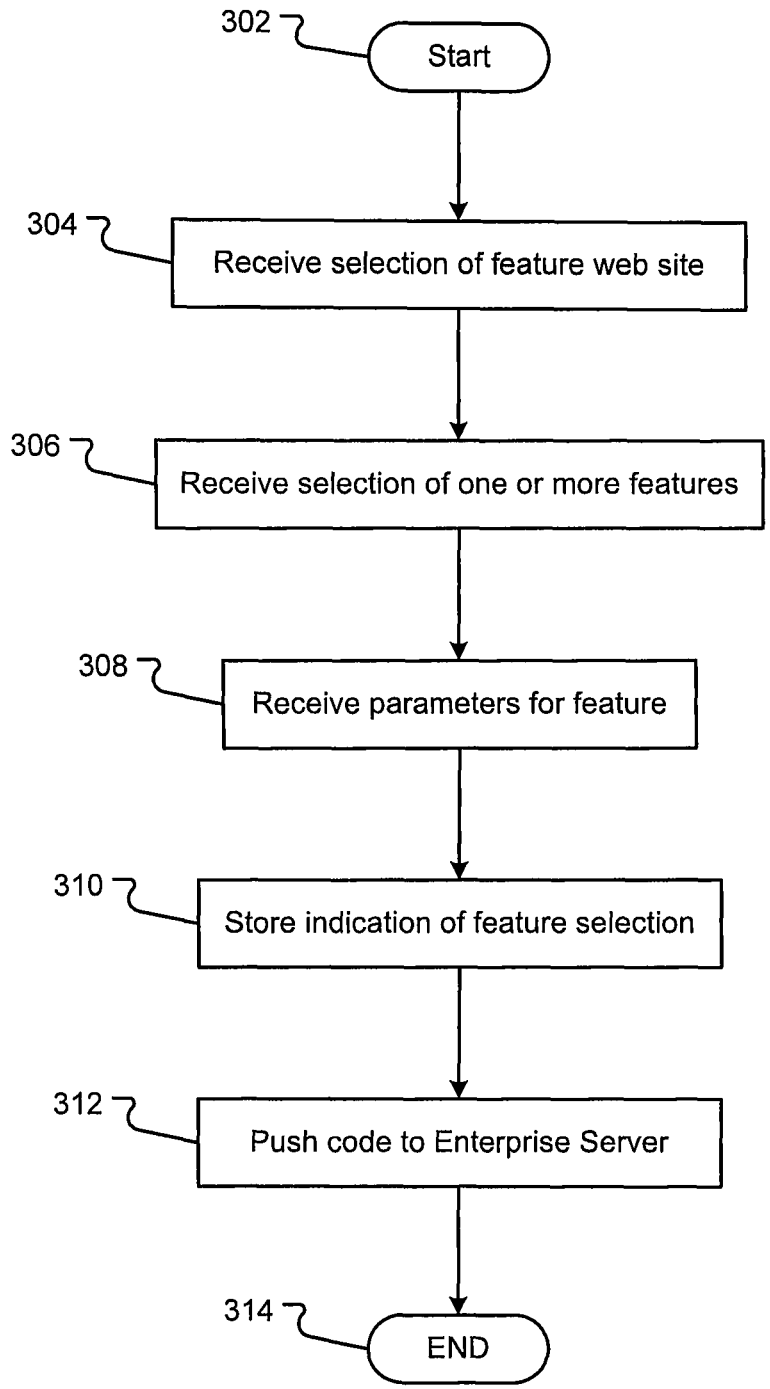
FIG. 3 is a flow diagram of an embodiment of a process for activating a feature at an enterprise server.

An embodiment of a method 300 for selecting features is shown in FIG. 3.

Generally, the method 300 begins with a start operation 302 and terminates with an end operation 314. While a general order for the steps of the method 300 are shown in FIG. 3, the method 300 can include more or fewer steps or arrange the order of the steps differently than those shown in FIG. 3. The method 300 can be executed as a set of computer-executable instructions executed by a general or special purpose computer system and encoded or stored on a computer readable medium. Hereinafter, the method 300 shall be explained with reference to the systems, components, modules, software, data structures, etc. described in conjunction with FIGS. 1-2C.

The enterprise server 102 receives selection of a feature website, in step 304. The selection of the feature website may be through user input 210 received by the feature user interface 202. The feature user interface 202 may provide a link or portal to the website at the intermediary server 106. Thus, when the user selects a button or other user interface device, that user input 210 is provided to the features interface 202 to select or communicate with a website at the intermediary server 106.

The enterprise server 102 receives selection from one or more features, in step 306. Upon selecting the feature website, the feature user interface 202 can provide a display of the feature website to the user. The user may then use one or more user interface devices to select one or more features for which the user desires to enable. The user input 210 is received by the feature user interface 202 as selections of one or more features. These selections may then be communicated to the intermediary server 106.

The enterprise server 102 may also receive one or more parameters for the features, in step 308. Some features may include parameters. For example, a feature may be operable only for a pre-determined period of times, thus, a feature may be selected that will be enabled for three months and then disabled at the end of that period of times. The pre-determined amount of time or the desire to have the feature only enabled for a pre-determined period of time can be a parameter that is received by the feature user interface 202. Other parameters may also be received for one or more other features. The feature user interface 202 receives the selections or parameter(s) to user input 210. These user parameters may also be communicated through intermediary server 106.

The intermediary server 106 may receive the features selection and the parameters at the mediator module 212. The mediator module may communicate these selections to procedure instantiator 214, which can store the indication of feature selection in the feature code database 218, in step 310. In alternative embodiments, the enterprise server 102 may also save the indication of features selection in the enterprise feature code database 208. Thus, both the intermediary server 106 and enterprise server 102 may store information about features selection such as the feature selected in step 306 and the parameters received in step 308.

Upon storing this information, the procedure instantiator 214 may push one or more items of feature code to the enterprise server 102, in step 312. For example, the enterprise server 102 may desire to instantiate or execute a feature in the future. However, in order to execute the feature, the enterprise server 102 may need at least a portion of the code related to the feature. As such, the procedure instantiator 214 can retrieve feature code from the feature code database 218 and provide the code to the encryption module 216 to be sent to the enterprise server 102. The enterprise server 102 may receive the code at the feature API 204 and store the code in the enterprise feature code database 208.

Figure 4A:
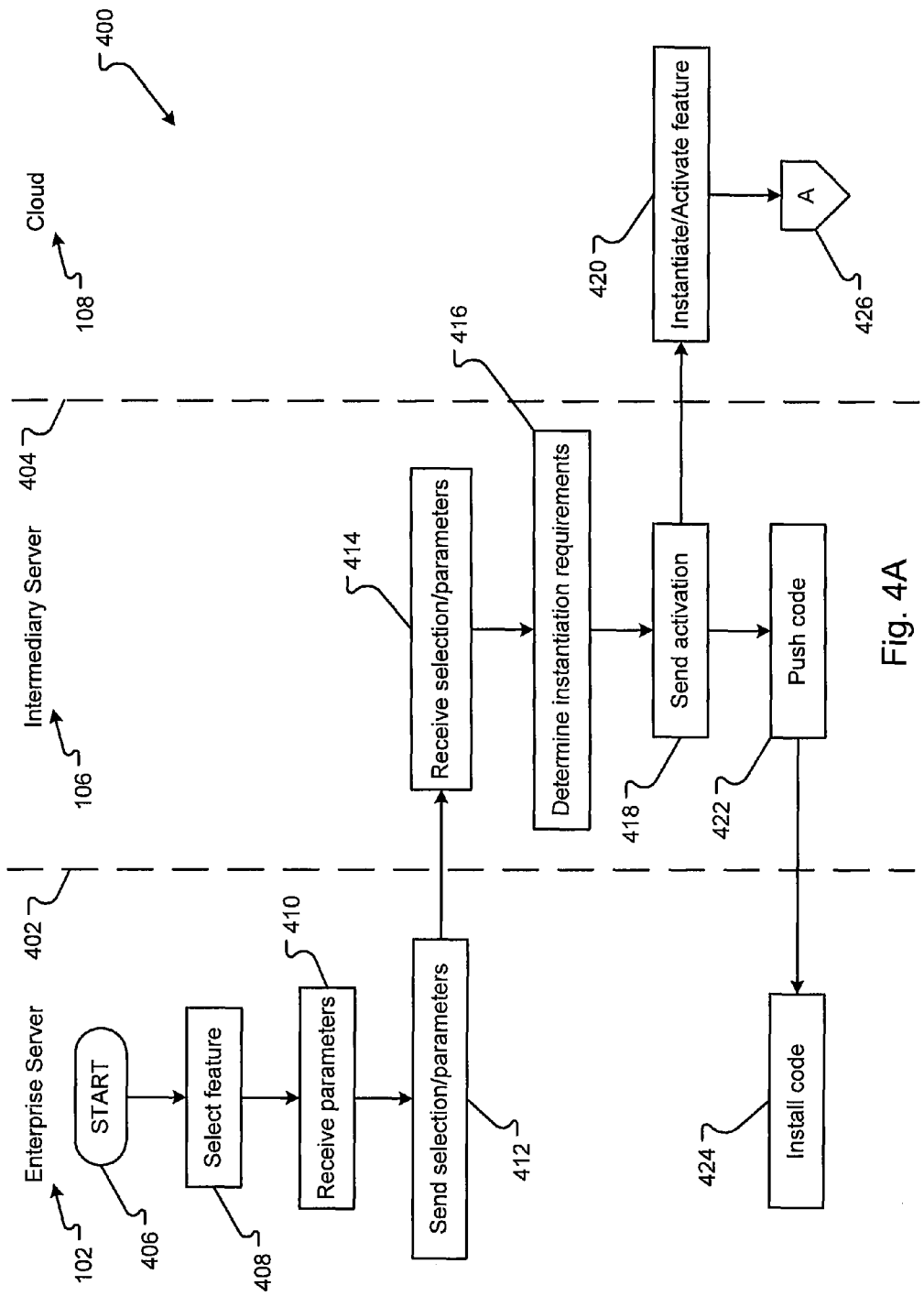
FIGS. 4A and 4B are flow diagrams of an embodiment of a process for executing a feature in a cloud computing environment.
Figure 4B:
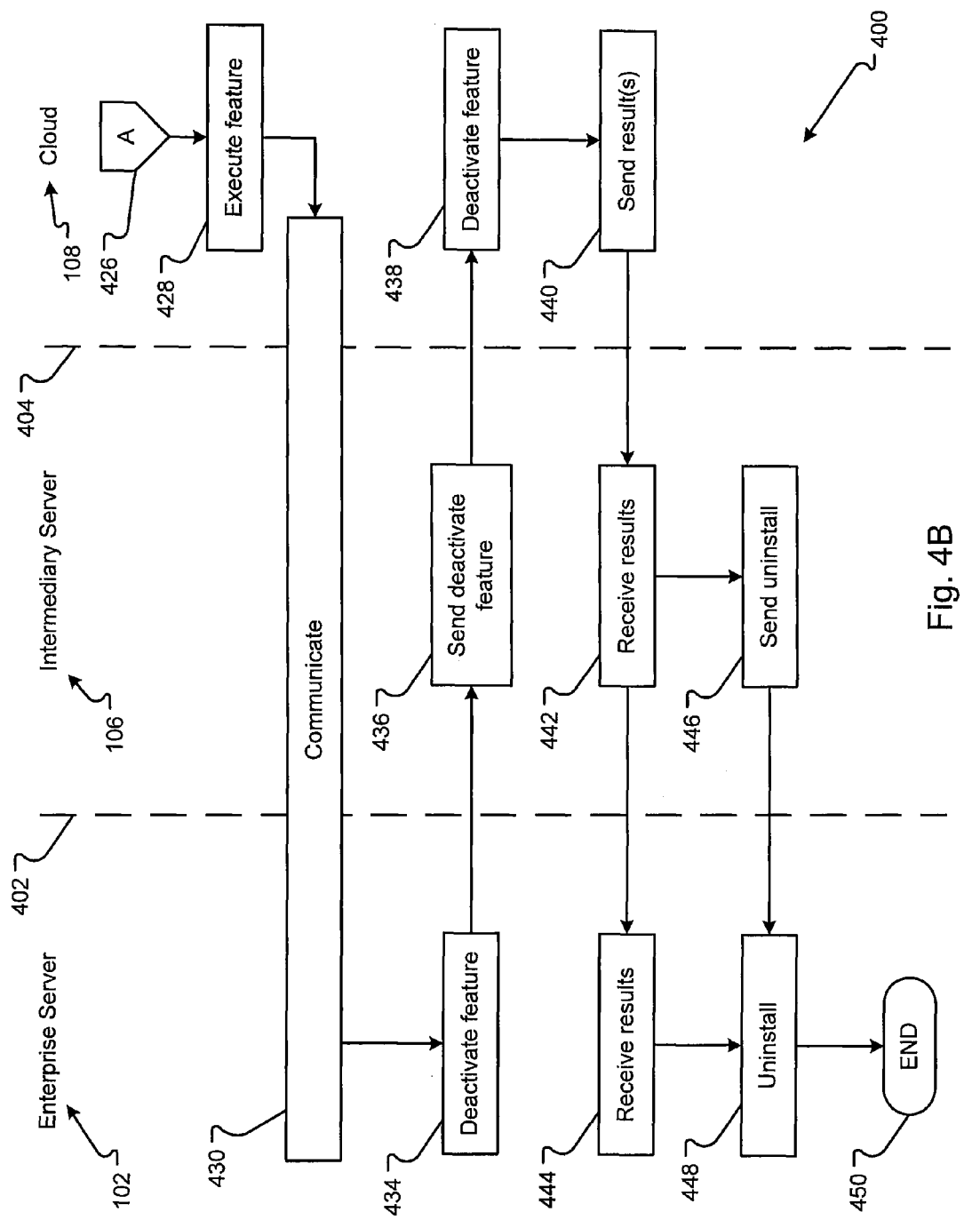

An embodiment of a method 400 for executing a feature in a combined environment with an enterprise server 102 and a cloud 108 is shown in FIGS. 4A and 4B. The method 400 in FIGS. 4A and 4B is a hybrid model where some portions of the feature are executed at the enterprise server 102 and some portions are executed at the cloud 108. The method 400 can be completed or executed by one of three systems. For example, some functions may be executed at the enterprise server 102, some at an intermediary server 106, and some at the cloud 108. The method steps that are executed at each of these different systems are separated by lines 402 and 404. In some embodiments, intermediary server 106 is optional and those tasks that the intermediary server 106 completes are executed by the cloud 108 or the enterprise server 102.

A user selects a feature, in step 408. The user may select a feature on the feature user interface 202 by selecting an interface device which provides user input 210 to an enterprise server 102. A feature user interface 202 can receive the user input 210 to determine which feature is selected. The feature user interface 202 may then provide another display to the user for the selection of parameters. Thus, the feature user interface 202 can receive second user input 210 from the feature user interface 202 for parameters, in step 410. Generally, the feature selection and the received parameters apply to a feature that has already been enabled and can be selected for use by the user through the enterprise server 102.

The feature user interface 202 provides the feature selection and the received parameters to the feature API 204. The feature API 204 can extract one or more portions of feature code from the enterprise feature code database 208 to begin the execution of the feature. However, the feature API 204 sends the selection and received parameters on to the intermediary server 106, in step 412. In some embodiments, the selection and the parameters are encrypted with encryption module 206 before sending the selection of the feature and the parameters to the intermediary server 106. The intermediary server 106 receives the selection of the feature and the parameters, in step 414. The mediator module 212 of the intermediary server 106 can receive the selection and parameters. The mediator module 212 can then send the selection of the feature and the parameters to the procedure instantiator 214. In some embodiments, the mediator module 212 may translate or convert the signals received for the feature and the parameters into a form understandable by the procedure instantiator 214.

The procedure instantiator 214 can interpret the selection and the parameters and extract the correct feature code from the feature code database 218. From the metadata or other information about the feature code in the feature code database 218, the procedure instantiator 214 can determine the instantiation requirements for the feature, in step 416. The instantiation requirements can delineate the processing speeds, storage requirements, memory requirements, or other requirements needed for the feature to execute properly in a cloud 108.

The procedure instantiator 214 may then package the feature code and the required instantiation requirements into a packet and send the packet to the cloud 108. This packet can be an activation directive or request sent to the cloud 108, in step 418. The cloud 108 can receive the activation directive or request. In response to receiving activation directive or request, the cloud 108 can instantiate or activate the feature, in step 420. To activate the feature, the cloud 108 may send the feature code to a cloud server 110. The cloud server 110 can store the code in storage 226 and in memory 224 and then execute the code in the cloud processing 222 from memory 224. Executing the feature code instantiates an instance of the feature in the cloud server 110 which then can provide functionality to the enterprise server 102.

In some embodiments, the intermediary server 106 may also push code to the enterprise server 102, in step 422. Thus, the intermediary server 106 can store all the code in the feature code database 218 for use in executing the feature. The procedure instantiator 214 can retrieve the feature code required by the enterprise server 102 from the feature code database 218 and send that code to the enterprise server 102. In embodiments, the encryption module 216 can encrypt the code or information sent from the procedure instantiator 214 to the enterprise server 102.

The enterprise server 102 can receive the code and then install the code, in step 424. The enterprise server 102 can receive the encrypted code at the encryption module 206 and decrypt the code to provide to the feature API 204. The feature API 204 can store the feature code into the enterprise feature code database 208. Further, the feature API 204 may then execute the feature code required by the enterprise server 102. In this way, both the cloud server 110 and the enterprise server 102 execute portions of the feature code in a hybrid system.

The method 400 flows through page connector A 426 to FIG. 4B. In FIG. 4B, the cloud 108 executes the feature 428. The cloud processing function 222 can execute the feature code and communicate results to the intermediary server 106 or to the enterprise server 102. During execution of the feature, both the intermediary server 106 and the enterprise server 102 can communicate with the cloud 108, in step 430. Execution of the feature is on-going and provides communication signals between the cloud 108, intermediary server 106, and/or the enterprise server 102 during execution. It should be noted that step 430 is shown spanning the areas of the cloud 108, the intermediary server 106, and the enterprise server 102. This depiction does not limit the embodiments to the use of the intermediary server 106, some embodiments may include the cloud 108 and enterprise server 102 communicating directly without the intermediary server 106.

At some point, it is possible that the enterprise server 102 to request that the feature be deactivated, in step 434. The selection of the deactivation of the feature can be received as user input 210 at the feature user interface 202. The communication of the deactivation selection can be communicated by the feature user interface 202 to the feature API 204. The feature API 204 can select the deactivation signal and send the signal through the encryption module 206 to either the intermediary server 106 or the cloud 108. If received by the intermediary server 106 at the mediator module 212, the mediator module 212 can send the signal to the procedure instantiator 214 to deactivate the feature. The procedure instantiator 214 can then send the signal to the encryption module 216 for the cloud 108 to deactivate the feature, in step 436.

The cloud 108 can receive the deactivation signal and then deactivate the feature, in step 438. Deactivating the feature may include the cloud processing 222 stopping the execution of the feature, clearing the memory 224, and storing any information that must be kept in storage 226. The information stored in storage 226 may be results that are needed by the enterprise server 102. As such, the cloud server 110 can send the results, in step 440. The results may be sent to the intermediary server 106 or the enterprise server 102. The enterprise server 102 may receive the results, in step 442. The results can be received by the encryption module 216 and decrypted for the procedure instantiator 214. The procedure instantiator 214 may store some or all of the results in the feature code database 218 and provide the results to the mediator module 212. The mediator module 212 can send the results to the enterprise server 102. In other embodiments, the procedure instantiator 214 can send the results to the encryption module 216 for the enterprise server 102.

Regardless, of the source of the results, whether the results are from the cloud 108 or the intermediary server 106, the enterprise server 102 can receive the results, in step 444. The results may be stored by the enterprise server 102 in the enterprise feature code database 208. The feature API 204 can provide the results through the feature user interface 202 to the user.

In alternative embodiments, the enterprise server 102, after deactivating a feature, may be sent an uninstall signal, in step 446. The uninstall signal may be sent from the intermediary server 106 to the enterprise server 102 to uninstall the feature from enterprise server 102. The uninstall signal may be received by the enterprise server 102, in step 448. To uninstall the feature, the feature API 204 may delete a portion of code related to the feature from the feature code database 208. As such, the enterprise server 102 may be unable to activate the feature in the future until the feature is re-enabled at a future time.

FIG. 5 illustrates a block diagram of a computing environment 500 that may function as servers, computers, or other systems provided herein. The environment 500 includes one or more user computers 505, 510, and 515. The user computers 505, 510, and 515 may be general purpose personal computers (including, merely by way of example, personal computers, and/or laptop computers running various versions of Microsoft Corp.'s Windows™ and/or Apple Corp.'s Macintosh™ operating systems) and/or workstation computers running any of a variety of commercially-available UNIX™ or UNIX-like operating systems. These user computers 505, 510, 515 may also have any of a variety of applications, including for example, database client and/or server applications, and web browser applications. Alternatively, the user computers 505, 510, and 515 may be any other electronic device, such as a thin-client computer, Internet-enabled mobile telephone, and/or personal digital assistant, capable of communicating via a network 520 and/or displaying and navigating web pages or other types of electronic documents. Although the exemplary computer environment 500 is shown with three user computers, any number of user computers may be supported. In another embodiment, the cloud 108 includes servers that may be running virtualization software, for example, Xen, Citrix, VMWare, or Microsoft Hyper-V, that enables one physical server to operate or execute multiple operating systems.

Environment 500 further includes a network 520. The network 520 may can be any type of network familiar to those skilled in the art that can support data communications using any of a variety of commercially-available protocols, including without limitation SIP, TCP/IP, SNA, IPX, AppleTalk, and the like. Merely by way of example, the network 520 maybe a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, the Bluetooth™ protocol known in the art, and/or any other wireless protocol); and/or any combination of these and/or other networks. The network 520 may be the same or similar to network 106.

The system may also include one or more server 525, 530. In this example, server 525 is shown as a web server and server 530 is shown as an application server. The web server 525, which may be used to process requests for web pages or other electronic documents from user computers 505, 510, and 515. The web server 525 can be running an operating system including any of those discussed above, as well as any commercially-available server operating systems. The web server 525 can also run a variety of server applications, including SIP servers, HTTP servers, FTP servers, CGI servers, database servers, Java servers, and the like. In some instances, the web server 525 may publish operations available as one or more web services.

The environment 500 may also include one or more file and or/application servers 530, which can, in addition to an operating system, include one or more applications accessible by a client running on one or more of the user computers 505, 510, 515. The server(s) 530 and/or 525 may be one or more general purpose computers capable of executing programs or scripts in response to the user computers 505, 510 and 515. As one example, the server 530, 525 may execute one or more web applications. The web application may be implemented as one or more scripts or programs written in any programming language, such as Java™, C, C#™, or C++, and/or any scripting language, such as Perl, Python, or TCL, as well as combinations of any programming/scripting languages. The application server(s) 530 may also include database servers, including without limitation those commercially available from Oracle, Microsoft, Sybase, IBM and the like, which can process requests from database clients running on a user computer 505.

The web pages created by the server 525 and/or 530 may be forwarded to a user computer 505 via a web (file) server 525, 530. Similarly, the web server 525 may be able to receive web page requests, web services invocations, and/or input data from a user computer 505 and can forward the web page requests and/or input data to the web (application) server 530. In further embodiments, the web server 530 may function as a file server. Although for ease of description, FIG. 6 illustrates a separate web server 525 and file/application server 530, those skilled in the art will recognize that the functions described with respect to servers 525, 530 may be performed by a single server and/or a plurality of specialized servers, depending on implementation-specific needs and parameters. The computer systems 505, 510, and 515, web (file) server 525 and/or web (application) server 530 may function as the system, devices, or components described herein.

The environment 500 may also include a database 535. The database 535 may reside in a variety of locations. By way of example, database 535 may reside on a storage medium local to (and/or resident in) one or more of the computers 505, 510, 515, 525, 530. Alternatively, it may be remote from any or all of the computers 505, 510, 515, 525, 530, and in communication (e.g., via the network 520) with one or more of these. The database 535 may reside in a storage-area network ("SAN") familiar to those skilled in the art. Similarly, any necessary files for performing the functions attributed to the computers 505, 510, 515, 525, 530 may be stored locally on the respective computer and/or remotely, as appropriate. The database 535 may be a relational database, such as Oracle 101™, that is adapted to store, update, and retrieve data in response to SQL-formatted commands.

FIG. 6 illustrates one embodiment of a computer system 600 upon which the servers, computers, or other systems or components described herein may be deployed or executed. The computer system 600 is shown comprising hardware elements that may be electrically coupled via a bus 655. The hardware elements may include one or more central processing units (CPUs) 605; one or more input devices 610 (e.g., a mouse, a keyboard, etc.); and one or more output devices 615 (e.g., a display device, a printer, etc.). The computer system 600 may also include one or more storage devices 620. By way of example, storage device(s) 620 may be disk drives, optical storage devices, solid-state storage devices such as a random access memory ("RAM") and/or a read-only memory ("ROM"), which can be programmable, flash-updateable and/or the like.

The computer system 600 may additionally include a computer-readable storage media reader 625; a communications system 630 (e.g., a modem, a network card (wireless or wired), an infra-red communication device, etc.); and working memory 640, which may include RAM and ROM devices as described above. The computer system 600 may also include a processing acceleration unit 635, which can include a DSP, a special-purpose processor, and/or the like.

The computer-readable storage media reader 625 can further be connected to a computer-readable storage medium, together (and, optionally, in combination with storage device(s) 620) comprehensively representing remote, local, fixed, and/or removable storage devices plus storage media for temporarily and/or more permanently containing computer-readable information. The communications system 630 may permit data to be exchanged with the network 520 (FIG. 5) and/or any other computer described above with respect to the computer system 600. Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information.

The computer system 600 may also comprise software elements, shown as being currently located within a working memory 640, including an operating system 645 and/or other code 650. It should be appreciated that alternate embodiments of a computer system 600 may have numerous variations from that described above. For example, customized hardware might also be used and/or particular elements might be implemented in hardware, software (including portable software, such as applets), or both. Further, connection to other computing devices such as network input/output devices may be employed.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments were described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc.

When a process corresponds to a function, its termination corresponds to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

While illustrative embodiments have been described in detail herein, it is to be understood that the concepts may be otherwise variously embodied and employed, and that the appended claims are intended to be construed to include such variations, except as limited by the prior art.

What is claimed is:

1. A method for executing a feature, the method comprising:
    an intermediary server receiving a selection of the feature from an enterprise server;
    determining instantiation requirements for the feature;
    the intermediary server generating an activation signal for cloud processing to activate the feature in a cloud;
    wherein the cloud instantiates and executes the feature for the enterprise server;
    storing information about the selection of the feature in both the enterprise server and the intermediary server; and
    in response to storing the information about the selection of the feature, the intermediary server pushing feature code to the enterprise server, wherein the intermediary server receives payment for the feature from the enterprise server and forwards the payment for the feature to the cloud.

2. The method as defined in claim 1, wherein receiving the selection of the feature comprises:
    receiving a selection of a feature web site;
    receiving a selection of the feature from the feature web site; and
    receiving a parameter associated with the feature.

3. The method as defined in claim 1, wherein during execution of the feature, the cloud communicates with the enterprise server.

4. The method as defined in claim 3, further comprising:
    receiving a deactivate signal for the feature; and
    directing the cloud processing to stop execution of the feature.

5. The method as defined in claim 4, wherein after receiving the deactivate signal, storing data associated with the deactivated feature.

6. The method as defined in claim 1, wherein the cloud is a computing system operated by a third party.

7. The method as defined in claim 1, further comprising the step of encrypting data in an endpoint using a shared encryption key, wherein the data is stored in the cloud.

8. The method as defined in claim 1, wherein the feature can be executed in the enterprise server, in the intermediary server, and in the cloud.

9. The method as defined in claim 1, wherein the intermediary server receives billing information for the feature from the cloud and in response to receiving the billing information from the cloud, reformats the billing information from the cloud, and sends the reformatted billing information to the enterprise server.

10. A non-transitory computer readable medium having stored thereon instructions that cause a computing system to execute a method for activating a feature in a cloud, the instructions comprising:
    instructions to receive a selection of a feature web site;
    instructions to receive a selection of a feature from the feature web site;
    instructions to receive a parameter associated with the feature;
    instructions to send the selection of the feature and parameter to activate the feature;
    instructions to store the selection of the feature in both an enterprise server and an intermediary server, wherein the selection of the feature and parameter are sent to the intermediary server to activate the feature in the cloud;
    instructions to push feature code from the intermediary server, wherein the feature code is pushed in response to storing the selection of the feature;
    instructions to receive, at the intermediary server, payment for the feature from the enterprise server; and
    instructions to forward the payment for the feature to the cloud.

11. The non-transitory computer readable medium as defined in claim 10, once the feature is activated, the instructions further comprising:
    instructions to install feature code; and
    instructions to communicate with the cloud after an instance of the feature is instantiated on the cloud and is executed.

12. The non-transitory computer readable medium as defined in claim 11, further comprising:
    instructions to receive a deactivation signal for the feature; and
    instructions to send the deactivation to the cloud to deactivate the feature.

13. The non-transitory computer readable medium as defined in claim 12, further comprising:
    instructions to receive results associated with deactivating the feature;
    instructions to store the results; and
    instructions to uninstall the feature code.

14. The non-transitory computer readable medium as defined in claim 13, wherein the communications with the cloud and the results are encrypted by the cloud when sent from the cloud and wherein the cloud does not store the results.

15. A feature provider system comprising:
    an intermediary server, the intermediary server operable to receive a selection for a feature from an enterprise server, store information about the selection for the feature, push feature code to the enterprise server in response to storing the information about the selection for the feature, receive payment for the feature from the enterprise server, and forward the payment for the feature to a cloud;
    the enterprise server, the enterprise server operable to store the information about the selection for the feature; and the cloud in communication with the enterprise server, the cloud operable to receive the selection for the feature from the intermediary server, instantiate an instance of the feature, execute the feature, and send communications to the enterprise server associated with the execution of the feature.

16. The feature provider system as defined in claim 15, wherein the enterprise server comprises:
   a feature user interface operable to receive user input associated with the selection of the feature and operable to provide information to a user associated with the execution of the feature; and
   a feature application programming interface operable to interface with the cloud to receive the communications associated with the execution of the feature.

17. The feature provider system as defined in claim 15, wherein the cloud comprises:
   a cloud processing operable to instantiate an instanced of and execute the feature;
   a memory operable to store feature code; and
   a storage operable to store the feature code and results associated with the execution of the feature.

18. The feature provider system as defined in claim 15, wherein the intermediary server further comprises:
   a mediator module operable to communicate with the enterprise server; and
   a procedure instantiator operable to direct the instantiation of the feature on the cloud.

19. The feature provider system as defined in claim 15, wherein the enterprise server is further operable to deactivate a feature.

20. The feature provider system as defined in claim 15, wherein the intermediary server receives billing information for the feature from the cloud and in response to receiving the billing information from the cloud, reformats the billing information from the cloud, and sends the reformatted billing information to the enterprise server.

* * * * *